(12) United States Patent
Kubota et al.

(10) Patent No.: US 8,455,587 B2
(45) Date of Patent: Jun. 4, 2013

(54) CRYSTALLINE POLYAMIDE-TYPE RESIN COMPOSITION

(75) Inventors: Shyuji Kubota, Ohtsu (JP); Satoshi Sakai, Ohtsu (JP)

(73) Assignee: Toyo Boseki Kabushiki Kaisha, Osaka-shi (JP)

( * ) Notice: Subject to any disclaimer, the term of this patent is extended or adjusted under 35 U.S.C. 154(b) by 526 days.

(21) Appl. No.: 12/520,154

(22) PCT Filed: Dec. 19, 2007

(86) PCT No.: PCT/JP2007/074393
§ 371 (c)(1),
(2), (4) Date: Jun. 19, 2009

(87) PCT Pub. No.: WO2008/075699
PCT Pub. Date: Jun. 26, 2008

(65) Prior Publication Data
US 2010/0093936 A1    Apr. 15, 2010

(30) Foreign Application Priority Data

Dec. 20, 2006   (JP) .................................. 2006-342291

(51) Int. Cl.
C08L 77/02    (2006.01)
C08L 77/06    (2006.01)
C08L 77/10    (2006.01)
C08L 23/26    (2006.01)
E05C 17/22    (2006.01)

(52) U.S. Cl.
USPC ............................. 525/66; 525/426; 525/432

(58) Field of Classification Search
USPC ........................... 525/432, 66, 426
See application file for complete search history.

(56) References Cited

U.S. PATENT DOCUMENTS

| | | | |
|---|---|---|---|
| 4,921,889 A * | 5/1990 | Lausberg et al. | 523/400 |
| 2006/0111500 A1 | 5/2006 | Harada et al. | |
| 2009/0087601 A1 * | 4/2009 | Kobayashi et al. | 428/35.4 |
| 2010/0028583 A1 * | 2/2010 | Fish et al. | 428/36.91 |

FOREIGN PATENT DOCUMENTS

| | | |
|---|---|---|
| EP | 0999235 A1 | 5/2000 |
| EP | 1816166 A1 | 8/2007 |
| JP | 05-070682 A | 3/1993 |
| JP | 05-263560 A | 10/1993 |
| JP | 07-037430 A | 2/1995 |
| JP | 08-100116 A | 4/1996 |
| JP | 08-113705 A | 5/1996 |
| JP | 09-067517 A | 3/1997 |
| JP | 09-169903 A | 6/1997 |
| JP | 11-012459 A | 1/1999 |
| JP | 2002-505365 A | 2/2002 |
| JP | 2006-028231 A | 2/2006 |
| JP | 2006-056983 A | 3/2006 |
| JP | 2006-056984 A | 3/2006 |
| JP | 2006-143964 A | 6/2006 |
| WO | WO 98/29512 A1 | 7/1998 |
| WO | WO 99/45070 A1 | 9/1999 |
| WO | WO 2006/057254 A1 | 6/2006 |

OTHER PUBLICATIONS

Ryoji et al., elctronic translation of JP 08-113705 (Jul. 1996).*
Fukumoto, *Lecture on Plastics* (Nikkan Kogyo Shimbun, Ltd., Jul. 25, 1970), pp. 66-75 and 196.

* cited by examiner

*Primary Examiner* — Jeffrey Mullis
(74) *Attorney, Agent, or Firm* — Leydig, Voit & Mayer, Ltd.

(57) ABSTRACT

The invention provides a crystalline polyamide-type resin composition comprises (a) a crystalline polyamide resin composition comprising (i) 50 to 90% by weight of crystalline polyamide resin (A) having a relative viscosity in 96% sulfuric acid of not less than 3.5 and (ii) 50 to 10% by weight of a crystalline polyamide resin (B) having a melting point lower than the melting point of polyamide resin (A) by 20° C. or more and a relative viscosity dissolved in 96% sulfuric acid of not more than 3.6, and (b) 1 to 10 part(s) by weight of a modified polyolefin resin (C) having a reactive functional group being able to react with the terminal group and/or main-chain amide group of the polyamide resin. The invention also provides a door checker for automobiles prepared from the crystalline polyamide-type resin composition.

4 Claims, No Drawings

CRYSTALLINE POLYAMIDE-TYPE RESIN COMPOSITION

TECHNICAL FIELD OF THE INVENTION

The present invention relates to a crystalline polyamide-type resin composition comprising two kinds of crystalline polyamide resins having different relative viscosities and a modified polyolefin resin. More particularly, the present invention relates to a crystalline polyamide-type resin composition having excellent strength, rigidity and moldability and good durability against sliding and said composition is particularly suitable as mechanism parts which need a sliding characteristic such as door checker or gear of automobiles.

BACKGROUND ART

Although polyamide resin has a good slidability due to its crystallinity, many studies have been carried out already for achieving better sliding characteristic and a solid lubricant such as molybdenum disulfide, graphite or fluorine resin and a liquid lubricant such as various lubricant oil or silicone oil have been investigated as a main improving agent for sliding (Nonpatent Document 1).

With regard to a solid lubricant among those sliding improving agents, it is necessary to compound a large amount of the solid lubricant if a sliding characteristic of the resin inherently having an excellent sliding characteristic such as a polyamide resin is to be further improved. That significantly lowers the tenacity of the polyamide resin used as a base and, as a result, not only evaluation standards for molded part for automobiles such as heat cycle are not met but also expensive solid lubricant is compounded in a large amount whereby that is not preferred from an economical view. On other hand, although a liquid lubricant is able to give a highly effective slidability to the resin such as engineering plastic in a relatively small amount, its miscibility with the resin used as a base is poor in many cases and it often happens that surfaces of the molded product are polluted with the liquid lubricant whereby, in the product where a slidability is improved using the liquid lubricant as such, the use thereof is limited.

It has been in the meanwhile proposed that various kinds of such lubricants are not compounded but a highly viscous polyamide resin where molecular weight of polyamide resin is made significantly high is used whereby the mechanical characteristic is improved and, at the same time, sliding characteristic such as low friction or low abrasion is improved. It has been also mentioned that a low-molecular compound such as higher fatty acid, higher fatty acid ester or higher fatty acid amide compound is added as an improving agent for moldability if necessary (Patent Documents 1 and 2).

However, when a highly viscous polyamide resin is used, although the sliding characteristic of the product is improved, its moldability or particularly that upon injection becomes very bad whereby fluidity in a complicated molded product, a thin molded product or a composite molded product into which metal or the like is inserted becomes bad, the molding becomes difficult and the use is limited. When a low-molecular compound such as higher fatty acid is compounded for improving the moldability, although the moldability becomes somewhat better, mechanical strength of the molded product significantly lowers to an extent of more than the advantages in the moldability whereby that is not preferred.

(Nonpatent Document)
1. Lecture on Plastics [16], polyamide resin, p. 66-75 Nikkan Kogyo Shimbun, Ltd. (1970)

(Patent Documents)
1. Japanese Patent Application Laid-Open (JP-A) No. 2006-56983
2. Japanese Patent Application Laid-Open (JP-A) No. 2006-56984

DISCLOSURE OF THE INVENTION

Problem that the Invention is to Solve

Under such circumstances, an object of the present invention is to provide a polyamide-type resin composition which retains a high mechanical characteristic or, particularly, a good shock resistance and wherein an excellent durability against sliding is expressed together with an excellent moldability even if a highly viscous polyamide resin having high molecular weight is used.

Means for Solving the Problem

The present inventors have conducted intensive studies for achieving the above object and, as a result, they have found that, when a composition where two kinds of crystalline polyamide resins having different viscosities are the bases is compounded with a modified polyolefin resin where miscibility with the polyamide is improved, the above object of high mechanical strength and excellent slidability and moldability is able to be achieved whereupon the present invention has been accomplished.

Thus, the present invention relates to the followings.

(1) A crystalline polyamide-type resin composition, characterized in that, to 100 parts by weight of a crystalline polyamide resin composition comprising 50 to 90% by weight of crystalline polyamide resin (A) where relative viscosity of said resin dissolved in 96% sulfuric acid is not less than 3.5 and 50 to 10% by weight of a crystalline polyamide resin (B) where melting point is lower than melting point of the above crystalline polyamide resin (A) by 20° C. or more and relative viscosity of said resin dissolved in 96% sulfuric acid is not more than 3.6, 1 to 10 part (s) by weight of a modified polyolefin resin (C) having a reactive functional group being able to react with the terminal group and/or main-chain amide group of the polyamide resin is contained.

(2) The crystalline polyamide-type resin composition according to the above (1), wherein the modified polyolefin resin (C) having a reactive functional group being able to react with the terminal group and/or main-chain amide group of the polyamide resin is a modified polyethylene resin.

(3) A door checker for automobiles, characterized in that, said door checker is prepared from the crystalline polyamide-type resin composition mentioned in the above (1) or (2).

Advantages of the Invention

The present invention can provide a crystalline polyamide-type resin composition having an excellent durability against sliding without deterioration of the excellent mechanical characteristic or, particularly, resistances to shock, heat and chemicals of the crystalline polyamide resin and also having a good moldability. Accordingly, the crystalline polyamide-type resin composition of the present invention is able to be used within a broad field as parts for automobiles or, particularly, as mechanism parts such as door checker and gear where mechanical strength and sliding characteristic are necessary whereby said composition is greatly contributes in industry.

BEST MODE FOR CARRYING OUT THE INVENTION

The present invention will be illustrated in detail as hereunder.

With regard to the crystalline polyamide resin (A) where relative viscosity of said resin dissolved in 96% sulfuric acid is not less than 3.5 and the crystalline polyamide resin (B) where melting point is lower than melting point of the above crystalline polyamide resin (A) by 20° C. or more and relative viscosity of said resin dissolved in 96% sulfuric acid is not more than 3.6 of the present invention, there is no particular limitation so far as they are polymers having an amide bond (—NHCO—) in the main chain and exhibit crystallinity. Examples thereof include crystalline polyamide resin such as Nylon 6 (NY6), Nylon 66 (NY66), Nylon 46 (NY46), Nylon 11 (NY11), Nylon 12 (NY12), Nylon 610 (NY610), Nylon 612 (NY612), m-xylylene adipamide (MXD6), hexamethylenediamine-terephthalic acid polymer (6T), hexamethylenediamine-terephthalic acid and adipic acid polymer (66T), hexamethylenediamine-terephthalic acid and ϵ-caprolactam copolymer (6T/6), trimethylhexamethylenediamine-terephthalic acid (TMD-T), m-xylylenediamine with adipic acid and isophthalic acid polymer (MXD-6/I), trimethylhexamethylenediamine with terephthalic acid and ϵ-caprolactam copolymer (TMD-T/6) or diaminodicyclohexylenemethane (CA) with isophthalic acid and lauryllactam polymer although they are non-limitative.

A particularly preferred one as the crystalline polyamide resin (A) of the present invention is Nylon 66. Relative viscosity of the crystalline polyamide resin (A) of the present invention is of particular importance. Generally, in the measurement of relative viscosity of a polyamide resin, there are three measurement methods depending upon the type of the solvent into which the resin is dissolved and they are m-cresol, 96% sulfuric acid and 90% formic acid. In the present invention, relative viscosity of the crystalline polyamide resin (A) is measured using a 96% sulfuric acid solution (polyamide resin concentration: 1 g/dl; temperature: 25° C.) and the relative viscosity is not less than 3.5. Particular preferably, the relative viscosity is between 3.5 and 5.0.

On the other hand, a particularly preferred one as the crystalline polyamide resin (B) of the present invention is Nylon 6. Relative viscosity of the crystalline polyamide resin (B) is measured using a 96% sulfuric acid solution (polyamide resin concentration: 1 g/dl ; temperature: 25° C.) and the relative viscosity is not less than 3.6. Particular preferably, the relative viscosity is between 2.0 and 3.6.

In the present invention, melting point of the crystalline polyamide resin can be determined by a differential scanning calorimeter (DSC). Melting point can be known from endothermic peak temperature upon raising the temperature measured by a differential scanning calorimeter.

The modified polyolefin resin (C) of the present invention is a modified product of the following polyolefin resin. Thus, examples thereof include an olefin-type resin such as high-density polyethylene, low-density polyethylene, ultrahigh molecular weight polyethylene, linear low-density polyethylene, polypropylene, poly(1-butene) or poly(4-methylpentene). The more preferred one among the polyolefin-type resin as such is high-density polyethylene.

In order to enhance the miscibility of the polyolefin resin as such with a polyamide resin, it is necessary to endow with a reactive functional group which is able to react with terminal group and/or main-chain amide group of the polyamide resin. Specific examples of the functional group which can react with polyamide resin include carboxylic acid group, acid anhydride group, epoxy group, oxazoline group, amino group and isocyanate group and, among them, an acid anhydride group has high reactivity with the polyamide resin and is particularly preferred. Compounding amount of the modified polyolefin resin to 100 parts by weight of the crystalline polyamide resin composition is 1 to 10 part(s) by weight. Preferably, the compounding amount is 1 to 8 part(s) by weight.

If necessary, an improving agent for shock resistance and/or an inorganic filler may be added to the crystalline polyamide-type resin composition of the present invention within such an extent that such an addition does not deteriorate the object of the present invention. Specific examples of the above improving agent for shock resistance include a styrene-type thermoplastic elastomer such as styrene/butadiene/styrene block copolymer (SBS), styrene/isoprene/styrene block copolymer (SIS), styrene/ethylene-butylene/styrene block copolymer (SEBS), styrene/ethylene-propylene/styrene block copolymer (SEPS), styrene/ethylene-amylene/styrene block copolymer (vinyl SEPS), styrene/ethylene/butylene block copolymer (HSBR) and an olefin-type thermoplastic elastomer such as ethylene/propylene block copolymer (EPR) or ethylene/propylene/diene copolymer (EPDM). Among the thermoplastic elastomer as such, the particularly preferred one is a styrene/ethylene-butylene/styrene block copolymer (SEGS).

When a polyamide resin having a high viscosity is used as a resin for molding, excellent friction characteristic such as low friction and low abrasion can be achieved but there is a problem that fluidity upon molding becomes bad whereby the molding is not possible. Therefore, two kinds of polyamide resins having a melting point difference of not less than 20° C. are used. Although a composition is molded by setting the temperature corresponding to the polyamide resin having high melting temperature upon the molding, the apparent viscosity lowers in the polyamide resin having low melting temperature whereby fluidity is enhanced and moldability is enhanced.

It is also possible to further enhance the friction characteristic by addition of polyolefin resin or, particularly, polyethylene resin which has been known to be of low friction and low abrasion.

If necessary, an improving agent for shock resistance and/or an inorganic filler may be added to the crystalline polyamide-type resin composition of the present invention within such an extent that such an addition does not deteriorate the object of the present invention. Specific examples of the above improving agent for shock resistance include a styrene-type thermoplastic elastomer such as styrene/butadiene/styrene block copolymer (SBS), styrene/isoprene/styrene block copolymer (SIS), styrene/ethylene-butylene/styrene block copolymer (SEBS), styrene/ethylene-propylene/styrene block copolymer (SEPS), styrene/ethylene-amylene/styrene block copolymer (vinyl SEPS), styrene/ethylene/ butylene block copolymer (HSBR) and an olefin-type thermoplastic elastomer such as ethylene/propylene block copolymer (EPR) or ethylene/propylene/diene copolymer (EPDM). Among the thermoplastic elastomer as such, the particularly preferred one is a styrene/ethylene-butylene/styrene block copolymer (SEES).

In the shock resistance improving agent as such, it is preferred for enhancing the miscibility with the polyamide resin to endow with a reactive functional group which is able to react with terminal group and/or main-chain amide group of the polyamide resin. Specific examples of the functional group which can react with polyamide resin include carboxylic acid group, acid anhydride group, epoxy group, oxazoline group, amino group and isocyanate group and, among them, an acid anhydride group has high reactivity with the polyamide resin and is particularly preferred.

On the other hand, examples of the inorganic filler include talc, wollastonite, clay, alumina, kaolin and mica and the particularly preferred one is wollastonite. As to the inorganic filler, that which is treated with an aminosilane coupling agent as a surface treating agent for improving the adhesion to the polyamide resin may be used.

It is also possible to add, if necessary, heat-resistant stabilizer, antioxidant, ultraviolet preventer, light stabilizer, lubricant, crystal nucleus agent, releasing agent, antistatic agent, flame retardant, pigment, dye, etc. to the crystalline polyamide-type resin composition of the present invention.

There is no particular limitation for a process of producing the crystalline polyamide-type resin composition of the present invention and, as to a kneading apparatus, common uniaxial extruder, biaxial extruder, pressurizing kneader, etc. may be used while, in the present invention, a biaxial extruder is particularly preferred.

One of the embodiments is that the above-mentioned (A), (B) and (C) together, if necessary, with a shock resistance agent, an inorganic filler, etc. are mixed, poured into a biaxial extruder and homogeneously kneaded whereby a crystalline polyamide-type resin composition can be produced. The kneading temperature is preferred to be set between the melting point of the crystalline polyamide resin (A) having high melting point and the temperature which is higher than the above melting point by 50° C. and the kneading time is preferred to be about 0.5 to 15 minute(s).

The crystalline polyamide-type resin composition of the present invention is optimum as a material for door checker parts of automobiles. Besides mechanical strength and shock resistance, a door checker for automobiles is necessary to exhibit duration against sliding upon openings/closings of car doors for not less than 100,000 times. It is particularly necessary that friction and abrasion upon repeated sliding operations are small and doors are able to be smoothly opened/closed with a constant force at all times and that such mechanical characteristic that neither breakage nor deformation happens even if abnormal force is applied is available. Further, since a door checker is usually a part having a shape of being inserted with metal, close adhesion to metal part and moldability are also very important. The crystalline polyamide-type resin composition of the present invention can fulfill such a severe demand characteristic and, therefore, it is optimum as a material for door checker of automobiles.

EXAMPLES

The present invention will now be further specifically illustrated by using the following Examples although the present invention is not limited thereto.

Raw materials used for Examples and Comparative Examples of the present invention are as follows.

As to the crystalline polyamide resin, the following (a) to (f) were used.

(a) Polyamide 66 (RV=4.5, melting point=266° C.) Ultramide AS (BASF)
(b) Polyamide 66 (RV=3.7, melting point=265° C.): Amiran CM 3036 (Toray)
(c) Polyamide 66 (RV=2.8, melting point=265° C.): Amiran CM 3001N (Toray)
(d) Polyamide 6 (RV=3.5, melting point=234° C.): Toyobo Nylon T-850 (Toyobo)
(e) Polyamide 6 (RV=3.1, melting point=233° C.): Toyobo Nylon T-820 (Toyobo)
(f) Polyamide 6 (RV=2.5, melting point=233° C.): Toyobo Nylon T-800 (Toyobo)
(g) MXD 6 (RV=2.1, melting point=242° C.): Toyobo Nylon T-600 (Toyobo)

Further, acid-modified PE [MME 001 (Grand Polypro)] was used as a modified polyethylene; acid-modified SEGS [Toughtec M 1943 (Asahi Kasei)] was used as a modified thermoplastic elastomer; and wollastonite [FPW 800 (Kinseimatic)] was used as an inorganic filler.

Production of samples for the evaluation was done in such a manner that each of the materials was weighed in a compounding rate for crystalline polyamide-type resin composition shown in Table 1, mixed in a tumbler and poured into a biaxial extruder. Temperature set for the biaxial extruder was 250° C. to 300° C. and a kneading time was 5 to 10minutes. The resulting pellets were made into various kinds of samples for the evaluation using an injection molder. Temperature of the cylinder and the metal mold in the injection molder were 80 to 300° C. and 60° C., respectively.

Methods for the evaluation were as follows.

1. Relative viscosity (sulfuric acid method) of the polyamide resin: An Ubbelohde viscometer was used and the measurement was conducted at 25° C. for a 96% by mass sulfuric acid solution where the polyamide resin concentration was 1 g/dl.

2. Melt index (MI) : Amount of the resin which flowed during 10 minutes with a load of 2.16 kgf at the temperature of 280° C. was measured. The fact whether or not the moldability was available was judged by taking the MI data and fluidity by means of spiral follow into consideration.

3. Melting point of the polyamide: Endothermic peak temperature at the rising rate of 20° C./minute was determined using a differential scanning calorimeter (Exstar 6000; Seiko Instruments KK).

4. Charpy impact strength: Measurement was conducted in accordance with ISO 179/leA (notch available). The fact whether or not the shock resistance was available was judged by taking the measured data into consideration.

5. Durability against sliding: Door checker for automobiles was molded and a reciprocating opening/closing test was repeatedly conducted for 30,000 times using SUS 304 as a material to be slid. Evaluation was conducted for the appearances at the first tests and the 30,000-th test and, when there was no big change for roughness, etc. of the appearance on the slid surface upon a naked-eye evaluation, it was judged to pass the test.

Results of the evaluations are shown in Tables 1 and 2.

Each of Examples 1, 2, 4 and 7 was a composition where a shock resistance agent and an inorganic reinforcing agent were compounded and all of moldability, shock resistance and durability against sliding were good in any of the compositions.

Each of Examples 3, 5 and 8 was a composition containing neither shock resistance agent nor inorganic filler but all of moldability, shock resistance and durability against sliding met the evaluating standards.

Example 6 was a composition where the adding amount of modified polyethylene was increased but all of moldability, shock resistance and durability against sliding were in good results.

On the other hand, Comparative Example 1 was a composition where the relative viscosity RV of Polyamide 66 was low. Although the moldability was good, durability against sliding was poor and a significant detachment of the surface happened on the slid surface. It could not be used for a door checker because of a significant deterioration in the property. Comparative Examples 2 and 3 were compositions of sole Polyamide 66 system having high relative viscosity but, due to its poor moldability, evaluation of durability against sliding was not possible.

Comparative Examples 4 and 5 were the compositions where no modified polyolefin resin was added. Although the result of moldability and shock resistance was good, detachment of the surface of the sliding surface was too much whereby its actual use for a door checker was impossible.

Comparative Example 6 was a composition of a sole Polyamide 6 system and, although it exhibited high viscosity as a resin for molding, cylinder temperature of a molding machine was high whereby molding was possible. However, in the evaluation for durability against sliding, detachment of the surface of the slid surface was too much. The slid surface became high temperature instantly due to the heat of friction but it was likely that, since Polyamide 6 had a relatively low melting temperature, fusion of the surface took place resulting in detachment of the surface.

Industrial Applicability

The present invention can provide a crystalline polyamide-type resin composition having an excellent durability against sliding without deterioration of the excellent mechanical characteristic or, particularly, resistances to shock, heat and chemicals of the crystalline polyamide resin and also having a good moldability. Particularly, the crystalline polyamide-type resin composition of the present invention is optimum as door checker parts of automobiles, because its change in surface appearance is small against the tens of thousands of repeated sliding under high-load.

Also, the crystalline polyamide-type resin composition of the present invention can be used within a broad field as mechanical sliding parts, such as gear and bushing in a field of automobiles or electronics, where repeated sliding under high-load is necessary whereby said composition is greatly contributes in industry.

TABLE 1

| Composition and Physical property | | | | Example 1 | Example 2 | Example 3 | Example 4 | Example 5 | Example 6 | Example 7 | Example 8 |
|---|---|---|---|---|---|---|---|---|---|---|---|
| Polyamide-type resin composition | Nylon 66 | RV = 4.5 | % | 80 | | 80 | | 60 | 60 | 80 | 80 |
| | | RV = 3.7 | % | | 80 | | 80 | | | | |
| | | RV = 2.8 | % | | | | | | | | |
| | Nylon 6 | RV = 3.5 | % | | | | 20 | | | | |
| | | RV = 3.1 | % | | | 20 | | | | | |
| | | RV = 2.5 | % | 20 | 20 | | | 40 | 40 | | |
| | MXD6 | RV = 2.1 | % | | | | | | | 20 | 20 |
| | modified PE | | Phr | 2.5 | 2.5 | 2.5 | 2.5 | 2.5 | 6 | 2.5 | 2.5 |
| | modified SEBS | | Phr | 5 | 5 | | 5 | | | 5 | |
| | wollastonite | | Phr | 10 | 10 | | 10 | | | 10 | |
| Physical property | moldability | MI (g/10 minutes) | | 11 | 12 | 9.5 | 12 | 19 | 15 | 14 | 18 |
| | | moldability | | ○ | ○ | ○ | ○ | ○ | ○ | ○ | ○ |
| | shock resistance | Charpy impact strength (KJ/m$^2$) | | 11.4 | 10.5 | 9.6 | 12.0 | 9.3 | 10.4 | 10.3 | 9.3 |
| | | shock resistance | | ○ | ○ | ○ | ○ | ○ | ○ | ○ | ○ |
| | durability against sliding | surface appearance | | ○ | ○ | ○ | ○ | ○ | ○ | ○ | ○ |
| | | comprehensive evaluation | | ○ | ○ | ○ | ○ | ○ | ○ | ○ | ○ |

Note:
(%) and (Phr) for the polyamide-type resin compositions in the table show % by weight and part(s) by weight, respectively.

TABLE 2

| Composition and Physical property | | | | Comparative Example 1 | Comparative Example 2 | Comparative Example 3 | Comparative Example 4 | Comparative Example 5 | Comparative Example 6 |
|---|---|---|---|---|---|---|---|---|---|
| Polyamide-type resin composition | Nylon 66 | RV = 4.5 | % | | 100 | 100 | 80 | 80 | |
| | | RV = 3.7 | % | | | | | | |
| | | RV = 2.8 | % | 80 | | | | | |
| | Nylon 6 | RV = 3.5 | % | | | | | | 100 |
| | | RV = 3.1 | % | | | | | | |
| | | RV = 2.5 | % | 20 | | | 20 | 20 | |
| | MXD6 | RV = 2.1 | % | | | | | | |
| | modified PE | | Phr | 2.5 | 2.5 | 2.5 | | | 2.5 |
| | modified SEBS | | Phr | 5 | | 5 | | 5 | 5 |
| | wollastonite | | Phr | 10 | | 10 | 10 | 10 | 10 |
| Physical property | moldability | MI (g/10 minutes) | | 46 | 7 | 5 | 9.6 | 11 | 8 |
| | | moldability | | ○ | x | x | ○ | ○ | ○ |
| | shock resistance | Charpy impact strength (KJ/m$^2$) | | 8.2 | 6.3 | 12.0 | 9.3 | 11.1 | 11.4 |
| | | shock resistance | | Δ | x | ○ | ○ | ○ | ○ |
| | durability against sliding | surface appearance | | x | — | — | x | x | x |
| comprehensive evaluation | | | | x | x | x | x | x | x |

Note:
(%) and (Phr) for the polyamide-type resin compositions in the table show % by weight and part(s) by weight, respectively.

The invention claimed is:

1. A crystalline polyamide-type resin composition comprising
   (a) 100 parts by weight of a crystalline polyamide resin composition comprising
      (i) 50 to 90% by weight of Nylon 66, wherein the relative viscosity of Nylon 66 dissolved in 96% sulfuric acid is between 3.5 and 5.0 and
      (ii) 50 to 10% by weight of a Nylon 6 or m-xylylene adipamide, wherein the melting point of Nylon 6 or m-xylylene adipamide is lower than the melting point of Nylon 66 by 20° C. or more, and wherein the relative viscosity of Nylon 6 or m-xylylene adipamide dissolved in 96% sulfuric acid is between 2.0 and 3.6,
   (b) 1to 10part(s) by weight of a modified polyolefin resin (C) having a reactive functional group being able to react with the terminal group and/or main-chain amide group of the polyamide resin.

2. The crystalline polyamide-type resin composition of claim 1, wherein the modified polyolefin resin (C) having a reactive functional group being able to react with the terminal group and/or main-chain amide group of the polyamide resin is a modified polyethylene resin.

3. A door checker for automobiles, wherein the door checker is prepared from the crystalline polyamide-type resin composition of claim 1.

4. A door checker for automobiles, wherein the door checker is prepared from the crystalline polyamide-type resin composition of claim 2.

* * * * *